April 19, 1966 G. MILLER 3,247,339

SOUND ACTUATABLE CUT-OFF SWITCH

Filed Feb. 1, 1961

INVENTOR.

Gustave Miller

United States Patent Office 3,247,339

Patented Apr. 19, 1966

3,247,339
SOUND ACTUATABLE CUT-OFF SWITCH

Gustave Miller, 501 13th St. NW., Washington, D.C.

Filed Feb. 1, 1961, Ser. No. 86,538
11 Claims. (Cl. 200—61.01)

This invention relates to a sound actuatable cut-off switch plug and has for an object to provide an inexpensive small cut-off switch for an electric circuit that is operated by a selected sound, such as the sound of a telephone bell or a door bell, and is small enough to be housed in and be an integral part of a plug for connecting any suitable electric appliance to a source of electricity such as an electrical receptacle as conventionally located in a wall or other location.

There are many types of electrical appliances, particularly around the home that when, in operation, either interfere with or make it impossible to hear the sound of a door bell or the sound of a telephone, or to carry on a conversation on a telephone and furthermore, some appliances from their nature, although not interfering with hearing the sound of the door bell or telephone bell or with answering the door bell or telephone, yet are inherently dangerous in that there is a tendency to neglect the appliance during a conversation at the door or at the telephone, and the appliance is of such nature that it is dangerous when neglected. An electric iron or a mangle are two examples of appliances that may be dangerous if neglected in order to answer a door or telephone bell.

There are many other household appliances which it is desirable to automatically cut off, or at least to have them indicate that a telephone or door bell is ringing, although the use of the appliance normally drowns out the sound of the door bell or telephone bell to the human ear. Among such appliances are vacuum cleaners, floor waxers, floor polishers, radio sets, television sets, hair dryers, dish washers, garbage disposals, etc., all of which produce noises or sounds of their own that interfere with hearing the door bell or the telephone bell and, in addition, interfere with carrying on a conversation over the telephone or at the door.

It is an object of this invention to provide a sound actuatable cut-off switch plug which may be interposed between the appliance and the electric receptacle to react to the selected sound, such as the sound of the door bell or of the telephone bell, and in one form check the circuit to the appliance so as to change the operation of the appliance in such manner that such changed operation will be apparent to the user, and thus indicate to the user that a door bell or telephone bell is ringing, or, in another and more preferred form, that will actually cut off or interrupt the circuit to the appliance completely. This latter form is particularly useful in the case of an electric iron, so that when the person using the electric iron goes to answer the telephone, the circuit to the electric iron is automatically disconnected and interrupted while the person is away from the electric iron, thus diminishing the danger that the iron might be left on with the circuit going continuously therethrough, so as to heat up the iron to such a danger as to actually cause a fire in the home.

In one form of this invention, it is an object to provide an intermittent interrupter switch, which would intermittently interrupt the circuit to the appliance, as in the case of a vacuum cleaner, floor waxer and floor polisher or such other appliance actuated by a motor normally producing a steady sound or noise, so that when the circuit to such motor is intermittently interrupted, the sound or noise produced by the motor will change distinctively and thus indicate to the user that a bell is ringing which should be attended to.

In the other form of the invention, the sound of the door bell or telephone bell will completely interrupt the circuit to the appliance and maintain the circuit in interrupted condition until such time as the user deliberately takes action to restore the circuit. Thus, the circuit will be automatically interrupted and remain interrupted until it is deliberately by the mere act of touching a push button, for instance, is again restored to operate the appliance.

In brief, the invention consists of a sound actuated intermittently operated interrupter switch in one form, and in the other form, a switch automatically cut off by the sound of the bell—in each form, consisting of a sound responsive reed, which is either electrically conductive or carries an electrically conductive element therewith, and which is actuated by the sound to vibrate away from a normal position, in which normal position it completes the circuit to the appliance.

In one form, the reed vibrates toward and from the contact completing position, and in the other form, once it has vibrated away from the contact completing position, it is held away from the contact completing position by a solenoid actuated by a circuit parallel to the appliance circuit but not interrupted by the reed switch and held by such solenoid circuit in the interrupted or "off" position until such time as a push button switch is operated by the user to momentarily interrupt the circuit through the solenoid and permit the reed to return to appliance circuit completing position, in which position it normally remains in the absence of the actuating sound.

While the switch may be mounted anywhere in the appropriate circuit, one preferred form of mounting the switch, in either form, is to place it within a plug housing which may be provided with prongs at one end for plugging it into an electric wall receptacle, and provided with means for connecting the circuit wire of the appliance thereto, such means being either in the form of permanently connecting the circuit wire thereto in the usual manner that a circuit wire is connected to its connecting plug or, alternatively, to provide female contacts in the cut-off switch plug, into which conventional plug at the end of the wire of the appliance may be inserted.

Thus, in one form, the particular appliance may have either the cut-off switch or the interrupter switch of this invention as a permanent part at the end of its connecting circuit wire and in the other form, the cut-off switch plug of this invention may be interposed between the conventional plug of any appliance and the wall receptacle into which the appliance plug is thus connected.

As an additional feature of this invention, means are provided for adjusting the resonance pitch of the reed so that it will respond to the desired sound that it is desired that the user become aware of.

As a result of this invention, when it is used, it will be possible for the user of a household electric appliance, such as a vacuum cleaner, to be sure that she will not miss the sound of the door bell or of the telephone bell, if it should ring while operating the vacuum cleaner or other appliance—either the sound of the appliance will change as a warning to the user with one form, or the appliance motor will cut off with the other form. The same is true whether the appliance be a radio or television set, in connection with which the cut-off form of the invention should be preferable, as it will completely cut off the sound of the radio or the television set and enable the person to use the telephone or answer the door without interference from the sound of the radio or television.

With the above and related objects in view, this invention consists in the details of construction and combination of parts, as will be more fully understood from the following description, when read in conjunction with the accompanying drawing, in which.

Figure 1:
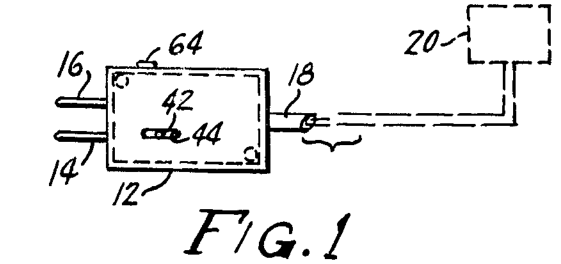
FIG. 1 is a schematic view of this invention utilized as a plug at the end of the circuit cable of an appliance.
Figure 6:
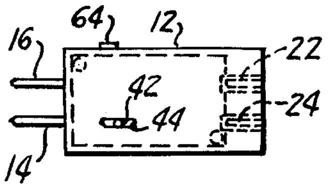
FIG. 6 is an elevational view of either form of the plug of this invention.
Figure 7:
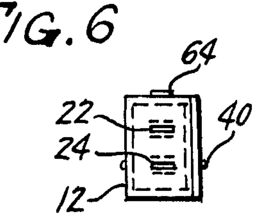
FIG. 7 is an end elevational view of FIG. 6.

There is shown at 10 the sound actuatable cut-off switch located within a plug housing 12. The plug housing 12 is provided with conventional plug prongs 14 and 16 at one end, for plugging the same into any conventional electric receptacle as a source of electricity, while at the other end, there may be connected a conductor cable 18 of conventional construction for connecting the plug and switch 10 into any type of appliance 20 in which this invention is particularly useful.

Instead of the housing 12 having a conductor cable 18 at the other end, it could instead have a pair of plug prong receiving female elements 22 and 24, as illustrated in FIGS. 4 to 7 inclusive. In this case, the appliance 20 and the cable 18 would have a conventional plug and plug prongs which would be plugged into the female contacts 22 and 24 in the conventional manner.

Within the housing 12, between prong 16 and the appliance conductor at the other end of the housing, either the cable 18 or the contact 24, there is located a sound responsive conductive reed 26. This reed 26 may be a completely conductive element or may have a conductive element included within it so as to conduct electricity between the prong 14 and the bus bar or conductor 28 connecting through the adjustable contact member 30 through the conductor reed 26. Obviously, the bus bar 28 may be connected to the conductor cable 18 as shown in FIG. 2, with the reed 26 connected to the prong 14, this being an immaterial reversal of parts.

Figure 2:
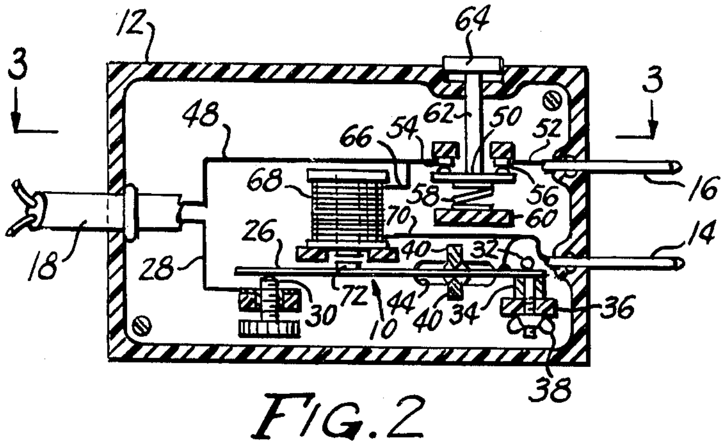
FIG. 2 is a sectional view through the plug of FIG. 1 of the circuit complete cut-off form of this invention, making the interior details visible.
Figure 3:
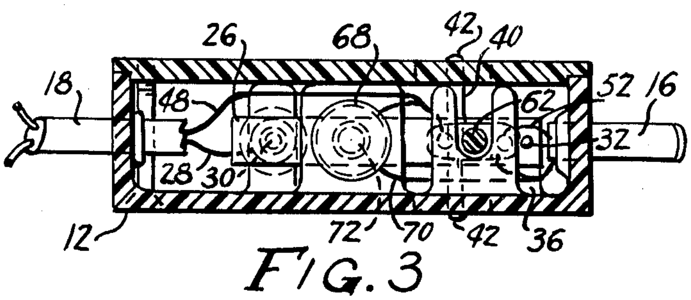
FIG. 3 is a sectional view on line 3—3 of FIG. 2.
Figure 5:
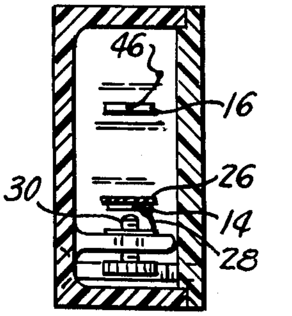
FIG. 5 is a sectional view on line 5—5 of FIG. 4.
Figure 4:
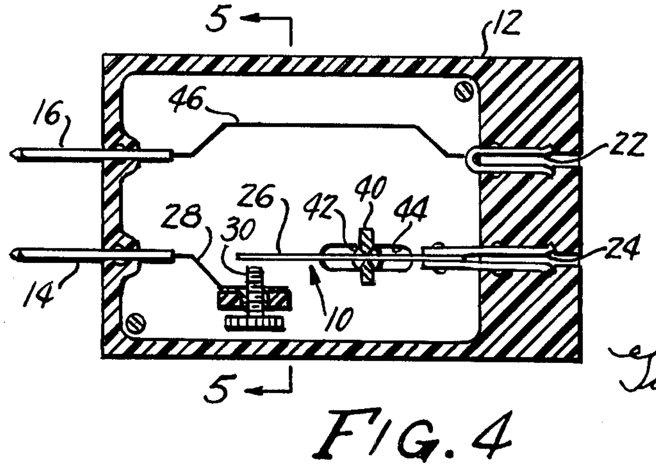
FIG. 4 is a sectional view similar to that of FIG. 2, but showing an intermittent circuit interrupter switch with the read contact in the temporary circuit interrupting position.

The reed 26 is anchored in any conventional manner at one end as to the female contact 24 in FIG. 4, or as at 32 in FIGS. 2 and 3. As here illustrated, the reed may be anchored by a bolt head 32 passing therethrough and through a spacing collar 34 against a boss 36 to which it is secured by an adjustable wing nut 38.

Means for adjusting the period of vibration of the reed 26 may be provided, if the reed is not pre-adjusted, to thereby selectively determine just what type of sound will cause ther eed to vibrate in response thereto. As here shown, the means for adjusting the resonant pitch of the reed 26 consists of a pair of nodes 40 on opposite sides thereof and secured to a transverse bar 42 extending through slots 44 in opposite sides of the housing 12. Obviously, the nodes 40 in effect provide a slot through which the reed 26 extends in the transverse bar 42, so that the nodes prevent vibration between their point of contact and the end anchoring means of the reed 26, but permit the free end of the reed 26 to vibrate in response to the sound. In this particular case, the sounds to which the reed will vibrate, the reed being made with the necessary characteristics, is the sound of at elephone bell or door bell or the like, but inasmuch as telephone bells have different pitch according to their adjustment, and likewise door bells, some adjustment means is provided for varying the resonant pitch of the reed.

In operation, as thus far described and applicable generally to the form of invention shown in FIG. 4 as well as that shown in FIG. 2, the ringing of the bell to which this reed is tuned will cause the reed 26 to vibrate, and vibrate away from the contact 30 which has previously been adjusted so as to be in contact with the conductive element in, or the conductive reed itself, 26, when the reed 26 is normally in non-vibrating condition. However, once the reed starts to vibrate, it will cause the appliance circuit from the prongs 14 and 16 passing through the housing to the appliance 20, to vibrate accordingly.

If the appliance is an electric vacuum cleaner, or a waxer or floor polisher or some other electric appliance which has a motor operating at a constant speed and providing a constant sound, vibration of the reed will cause an intermittent interruption of the circuit, and thus cause the sound of the motor in the appliance to vibrate, thus calling the attention of the user to the fact that a door bell or telephone bell is ringing because the appliance motor is vibrating in sound, and thus making the user aware of the ringing of the door bell or telephone bell, in spite of the fact that user does not hear the same due to the noise of the motor of the appliance 20.

However, it is very often desirable to cut off the operation of the appliance 20 when the door bell or the telephone bell is ringing, and to do this, the added elements shown in the form of FIGS. 2 and 3 are provided in the housing 12. The description thus far applies generally to both forms. However, when the appliance 20 may be a radio or television set, or may be a vacuum cleaner, a waxer or floor polisher, a dish washer or garbage disposal, or any other noise-producing appliance which makes it difficult or impossible both to hear the telephone bell ringing, and to use the telephone after it has rung, it is desirable that the appliance may have its appliance circuit cut off or interrupted completely. Even in the case of a noiseless appliance, such as an iron or a mangle, it is desirable to completely cut off the circuit to the iron or the mangle so as to prevent fire danger while the person answers the phone, there being many cases of fires having occurred because the party using the iron or mangle failed to cut off the current while answering the phone.

With this invention, the circuit to the iron or mangle or other appliance is automatically cut off and remains cut off until deliberately restarted when using the form of the invention of FIGS. 2 and 3.

In this form, the conducting means between the other prong 16 which, in FIG. 4, is shown as continuous at 46, in this case as at 48, is connected through a push button bridge switch 50 to the appliance circuit cable or other element at 18 by a further bus bar 52 connected to spaced contacts 54 and 56 between which the bridging switch 50 is held in position by a coil spring 58 biased against a boss 60, the bridge switch 50 being mounted on the end of a plunger 62 extending through the housing 12 and terminating in a push button 64 partly countersunk, as shown, so that when the push button 64 is depressed to its limit, the circuit is interrupted by the bridge switch 50 moving away from its contacts 54 and 56. Also connected to the bus bar or conductor 48 as at 66 is a solenoid 68 whose circuit is completed by a conductor 70 to the conductor leading to the prong 14, thus providing a parallel circuit through solenoid 68 that is parallel to the circuit through the cable 18 to appliance 20. The circuit through the solenoid 68 is subject to interruption by depressing the push button 64, but it is not interrupted by the operation of the reed 26.

Mounted on the reed 26 is an armature 72 to cooperate with the core of the solenoid 68, this armature 72 being normally too far from the core of the solenoid 68 to be attracted thereby so long as the reed 26 is in normal circuit-completing position with the contact 30. However, as soon as the reed 26 starts to vibrate in response to the selected sound of the bells for which this pitch has been adjusted, the armature 72 moves to within the range of the solenoid 68, which then immediately attracts the armature 72 and the reed 26 into contact with the solenoid 68 and holds the same firmly with the reed 26 out of contact and breaking the circuit to the contact 30. This immediately interrupts the circuit to the appliance 20, while the parallel solenoid circuit continues from prong 16 through the solenoid to prong 14. The appliance 20 is therefore immediately disconnected and, if it is a noisy appliance, discontinuance of the noisy appliance as well as the sound of the bell whether telephone bell or door bell, immediately makes the user aware that the telephone or door bell is ringing. The user may then abandon the appliance and answer the door bell or answer the telephone.

If appliance 20 happens to be a radio or television, it ceases operation so long as the user is using the telephone or answering the door bell, and the same is true whatever the type of appliance 20 may be. If the appliance 20 happens to be an electric iron, it is automatically cut off while the user answers the telephone, and thus avoids the danger that it might accidentally be left on and cause a fire while the user is at the telephone.

When the user is through with the telephone, before returning to the appliance 20, the user merely goes to the plug housing 20 and momentarily depresses the push button 64. This interrupts the solenoid circuit, releases the armature 72 and the reed 26 to go back to appliance circuit completing position, whatever the appliance may be. Release of the push button 64 after the momentary operation thereof places the solenoid 68 and the solenoid circuit therethrough, back in position for operation automatically on the next occasion that the door bell or telephone bell may sound.

Obviously, either form of this invention, the vibrating form shown in FIG. 4 or the complete cut off form shown in FIG. 2 and FIG. 3, may be made as an independent plug that can be plugged into any electric receptacle so that a conventional appliance can then be plugged in as at 22 and 24, or the appliance wire cable 18 may be directly connected to the bus bars through the plug in the conventional manner, as shown in FIG. 1.

The great advantage of this invention is that the person using the complete cut off form in FIGS. 2 and 3, immediately has the appliance so that it can be completely interrupted and cut off, making the sound of the bell instantly audible to the user.

The form of the invention shown in FIG. 4 will, of course, be used only with an appropriate appliance such as a vacuum cleaner, waxer or polisher or other appropriate appliance which usually has a motor having a continuous noise, the sound of which would be altered by having a vibrating circuit to it instead of a continuous circuit, thus making the user aware that a telephone or door bell must be ringing, even though the user does not hear it. Obviously, the length of the appliance wire 18 is usually sufficient when the appliance is adjusted for the door bell or telephone bell, to space the plug sufficiently far from the appliance that there is very little likelihood of the appliance sound interfering with the operation of the reed 26, which reed 26, of course, has been selected to be particularly responsive to the particular sound of a door bell or telephone bell and not at all responsive to the utterly different type of sound of an appliance motor, or the sounds usually issuing from a radio or television set.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A sound actuatable cut-off switch comprising, a switch housing, a pair of conductive elements extending at least part way through said housing, a pair of conductors extending at least part way through said housing, means for electrically connecting one of said conductive elements to one of said conductors, a contact mounted in said housing connected in circuit between the other of said elements and the other of said conductors, a tuned conductive reed means mounted in said switch housing, said tuned reed means normally completing a circuit with said contact, said tuned reed means, responsive to a selected range of sounds, vibrating away from said contact at said selected range of sounds, thereby correspondingly interrupting the electrical circuit between said tuned reed means and said contact.

2. A sound actuatable cut-off switch comprising, a switch housing, a pair of conductive elements extending at least part way through said housing, a pair of conductors extending at least part way through said housing, means for electrically connecting one of said conductive elements to one of said conductors, a contact mounted in said housing connected to the other of said elements, a sound responsive conductive tuned reed mounted in said switch housing, said tuned reed normally completing a through circuit with said contact, said tuned reed, responsive to a selected range of sounds, vibrating away from said contact at said selected range of sounds thereby correspondingly interrupting the electrical through circuit between said tuned reed and said contact, a solenoid mounted in said switch housing in a separate circuit between said pair of conductive elements and between the source of electricity thereto and said tuned reed and said contact, said solenoid being in the path of vibration of said tuned reed to capture and hold said tuned reed in through circuit interrupting position.

3. The sound-responsive switch of claim 2, and manually operatable means extending through said switch housing for momentarily interrupting said electrical circuit connection of said solenoid to thereby restore the circuit connection between said contact and said reed.

4. An electrical sound responsive switch comprising a switch housing, a pair of conductor means extending into, through, and out of said switch housing and adapted to be conductively connected to an appliance, one of said conductor means including an electrical contact and a sound-responsive conductive tuned reed both mounted in said switch housing, said tuned reed normally completing a circuit with said contact, said tuned reed, responsive to a selected range of sounds, vibrating away from said contact at said selected range of sounds, thereby correspondingly interrupting the electrical circuit between said tuned reed and said contact and thus providing an intermittent current to the appliance.

5. An electrical sound responsive switch comprising a switch housing, a pair of conductor means extending into, through, and out of said switch housing and adapted to be conductively connected to an appliance, one of said conductor means including an electrical contact and a sound-responsive conductive tuned reed both mounted in said switch housing, said tuned reed normally completing a circuit with said contact, said tuned reed, responsive to a selected range of sounds, vibrating away from said contact at said selected range of sounds, thereby correspondingly interrupting the electrical circuit between said tuned reed and said contact, a solenoid mounted in said switch housing in circuit between said pair of conductor means and between the source of electricity thereto and said tuned reed and said contact, said solenoid being in the path of vibration of said tuned reed to capture and hold said reed in current interrupting position to the appliance.

6. The switch of claim 5, and a normally closed solenoid circuit interrupting switch within said switch housing in the electrical circuit connection of said solenoid to said conductor means and a push button extending through said housing for manually and momentarily actuating said solenoid circuit interrupting switch.

7. The switch of claim 6, and reed adjusting means extending through the wall of said switch housing for adjusting said reed conductor to respond to a selected range of sounds.

8. An electrical plug sound-responsive switch comprising a plug housing, a pair of male connectors extending from one wall of said housing, a pair of female connectors extending at least part way through another wall of said housing, an electrical circuit connection between one male connector and one female connector, a tunable conductive reed mounted in said housing and electrically connected in circuit between the other of said male connectors and the other of said female connectors, a contact mounted in said housing and electrically connected in the some circuit between said other of said male and female conductors, said reed normally completing a circuit with said contact, said reed, responsive to a selected range of sounds, vibrating away from said contact at said selected range of sounds, thereby correspondingly interrupting the electrical circuit between said reed and said contact and thus providing an intermittent current therethrough.

9. The sound-responsive switch of claim 8, and reed tuning adjusting means mounted in and extending through a wall of said housing for adjusting said reed to respond to a selected range of sounds.

10. An electrical plug sound-responsive cut-off switch comprising a plug housing, male plug elements extending from one wall thereof and a pair of conductors extending at least partially through another wall thereof, a normally closed switch mounted in said housing having a pair of poles one of which is connected to one of said male elements and the other of which is connected to one of said conductors, a manually operable interrupter for said normally closed switch extending through said housing, a contact mounted in said housing connected in the circuit between said plug elements and said conductors, a sound responsive conductive tuned reed mounted in said switch housing, said reed normally completing said circuit with said reed between said plug elements and said conductors, said tuned reed, responsive to a selected range of sounds, vibrating away from said contact at said selected range of sounds thereby correspondingly interrupting said electrical circuit between said reed and said contact, a solenoid mounted in said switch housing in a separate circuit between said conductors and between the source of electricity thereto through said plug elements and said tuned reed and said contact, said solenoid being in the path of vibration of said tuned reed to capture and hold said tuned reed in through circuit interrupting position.

11. The sound-responsive switch of claim 10, and reed tuning means extending through a wall of said housing for adjusting said reed to respond to the selected range of sounds.

References Cited by the Examiner

UNITED STATES PATENTS

| | | | |
|---|---|---|---|
| 1,844,117 | 2/1932 | Du Mont | 200—61.01 |
| 1,900,353 | 3/1933 | Marchetti | 200—61.01 |
| 2,498,349 | 2/1950 | Van Velsor | 179—2 |
| 2,562,069 | 7/1951 | Stein et al. | 179—2 |
| 2,572,814 | 10/1951 | Laporte | 200—61.01 |
| 2,957,955 | 10/1960 | Sleeter | 200—51 |

BERNARD A. GILHEANY, *Primary Examiner.*

RICHARD M. WOOD, ROBERT K. SCHAEFER, *Examiners.*